(12) United States Patent
Bishop et al.

(10) Patent No.: US 6,709,309 B1
(45) Date of Patent: Mar. 23, 2004

(54) GAME CALL

(75) Inventors: Ricky Joe Bishop, Warmsprings, GA (US); Terry L. Butler, Neosho, MO (US)

(73) Assignee: Kolpin Outdoors, Inc., Fox Lake, WI (US)

( * ) Notice: Subject to any disclaimer, the term of this patent is extended or adjusted under 35 U.S.C. 154(b) by 0 days.

(21) Appl. No.: 09/598,590

(22) Filed: Jun. 21, 2000

Related U.S. Application Data

(60) Provisional application No. 60/140,690, filed on Jun. 24, 1999.

(51) Int. Cl.[7] .................................................. A63H 5/00
(52) U.S. Cl. ..................... 446/213; 446/188; 446/202; 446/206; 446/207; 446/208
(58) Field of Search ................................. 446/176–218

(56) References Cited

U.S. PATENT DOCUMENTS

| | | | | |
|---|---|---|---|---|
| 333,094 A | * | 12/1885 | Fuller ........................ 446/208 |
| 726,277 A | * | 4/1903 | Fuller ........................ 446/208 |
| 2,915,851 A | * | 12/1959 | Ringman ..................... 446/208 |
| 4,179,845 A | * | 12/1979 | Jacob ......................... 46/178 |
| 4,752,270 A | * | 6/1988 | Morton ....................... 446/207 |
| 4,950,198 A | * | 8/1990 | Repko ........................ 446/207 |
| 5,090,937 A | * | 2/1992 | Larue ......................... 446/207 |
| 5,577,946 A | * | 11/1996 | Oathout ...................... 446/208 |
| 5,785,574 A | * | 7/1998 | Sears ......................... 446/208 |
| 5,885,127 A | * | 3/1999 | Colyer ........................ 446/208 |
| 6,053,793 A | * | 4/2000 | Green ......................... 446/192 |
| 6,053,794 A | * | 4/2000 | Weiser ....................... 446/207 |
| 6,227,927 B1 | * | 5/2001 | Smith ......................... 446/192 |

* cited by examiner

*Primary Examiner*—Derris H. Banks
*Assistant Examiner*—Dmitry Suhol
(74) *Attorney, Agent, or Firm*—Brian G. Gilpin; Nicholas D. Doukas; Godfrey & Kahn, S.C.

(57) ABSTRACT

A game call is provided having an elongated tube having an inlet and outlet. A diaphragm is disposed in the tube. The game call has a pump assembly with a plunger slidably received within the tube between the inlet and the diaphragm. The plunger is movable with respect to the diaphragm so that air passes over and vibrates the diaphragm when the plunger is moved toward the diaphragm.

13 Claims, 4 Drawing Sheets

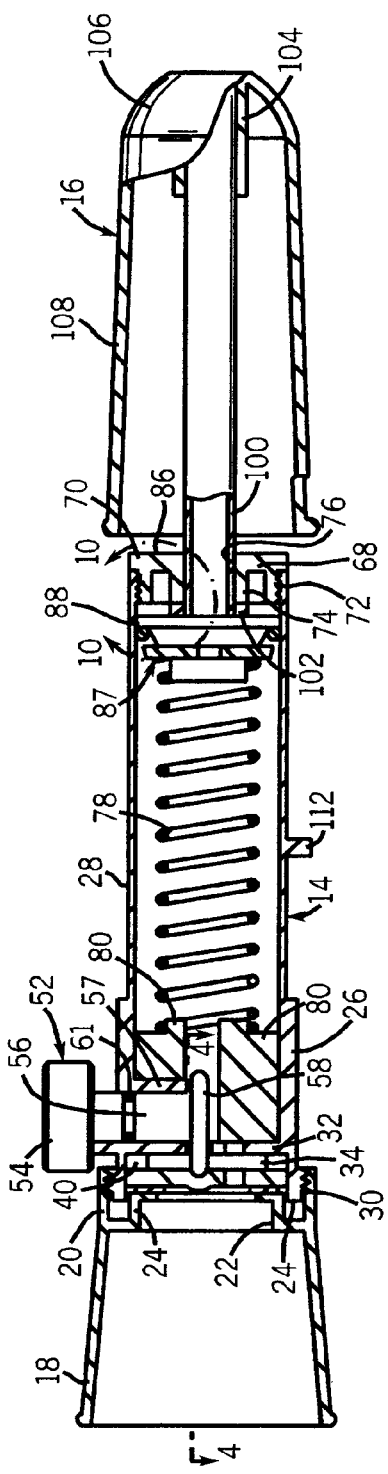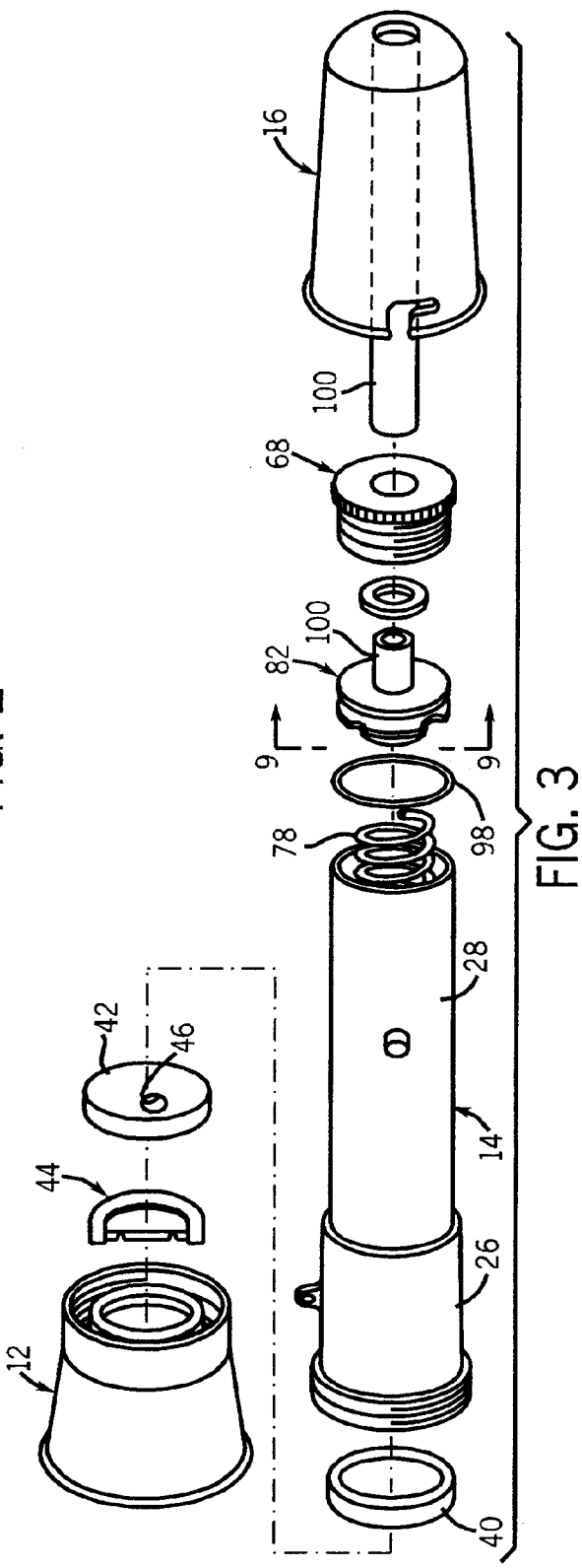
FIG. 2
FIG. 3

GAME CALL

CROSS-REFERENCE TO RELATED APPLICATIONS

This application claims the benefit of U.S. Provisional Patent Application No. 60/140,690, filed Jun. 24, 1999.

STATEMENT REGARDING FEDERALLY SPONSORED RESEARCH OR DEVELOPMENT

Not Applicable.

BACKGROUND OF THE INVENTION

This invention relates to a game call for attracting wildlife during a hunt or for observation. More specifically, this invention relates to a hand operated game call having a pump that forces air across a diaphragm to create animal sounds.

Hunters employ a number of different devices and methods to attract wildlife including predators and game such as elk, turkeys and geese. One particularly effective device is a diaphragm made of a thin material such as latex that is capable of vibrating to produce an animal sound. The diaphragm is held within the hunter's mouth and air is forced between the hunter's tongue and the surface of the diaphragm to create sounds closely emulating the desired animal sound. A skilled hunter may produce a variety of sounds by using the diaphragm. For example, the sounds typically made by a female turkey (or hen) during the mating process are oftentimes employed to draw male turkeys (or gobblers) toward the hunter. Another typical sound used to attract gobblers is the sound of rival gobblers lurking in the area. When the turkey is drawn within a reasonable distance, the hunter discharges his weapon to complete the hunt.

While the diaphragm call is capable of producing the desired animal sounds, it presents a number of drawbacks. For instance, the technique is relatively difficult to perform without a great deal of practice and training. Likewise, it is particularly difficult to reproduce the desired sounds accurately. Additionally, it is uncomfortable for many hunters to hold the diaphragm within the hunter's mouth for large periods of time. The use of mouth calls also presents the risks of gagging or choking on the diaphragm.

Thus, the need remains in the game call industry for a hand operated diaphragm call capable of reproducing a number of different wildlife sounds. The primary objective of this invention is to meet this need.

BRIEF SUMMARY OF THE INVENTION

Accordingly, an object of the present invention is to provide a call with a hand operable pump for forcing air across a diaphragm to produce animal sounds.

A further object of the present invention is to provide a call that produces a variety of different animal sounds by varying the pressure between a diaphragm and a gasket located adjacent to the diaphragm.

Still another object of the present invention is to provide a device that accurately reproduces a variety of sounds associated with the targeted animals.

A further object is to provide a game call that is operable with one hand and eliminates the need for a mouth operable call.

Another object of the present invention is to provide a compact call that is easily carried by the user.

In accordance with these and other objects evident from the following description of a preferred embodiment of the invention, a game call is provided which includes an elongated tube having an inlet and an outlet. A gasket is disposed within the tube and defines a passageway between the inlet and outlet of the tube. The gasket has a first surface directed toward the outlet and an opposing second surface directed toward the inlet. A diaphragm is positioned adjacent the first surface of the gasket and overlies at least a portion of the passageway. Air passes through the passageway and between the first surface of the gasket and the diaphragm to simulate an animal sound.

In another aspect of the invention, a game call is provided which includes an elongated tube having an inlet and outlet. A diaphragm is disposed in the tube. The game call has a pump assembly with a plunger slidably received within the tube between the inlet and the diaphragm. The plunger is movable with respect to the diaphragm so that air passes over and vibrates the diaphragm when the plunger is moved toward the diaphragm.

BRIEF DESCRIPTION OF THE DRAWINGS

The following description of the drawings, in which like reference numerals are employed to indicate like parts in various views:

FIG. 2 is an enlarged horizontal sectional view taken along lines 2—2 of FIG. 1 with the handle of the game call in the unlocked position;

FIG. 3 is a exploded perspective view of the game call of the present invention;

DETAILED DESCRIPTION OF THE INVENTION

Figure 1:
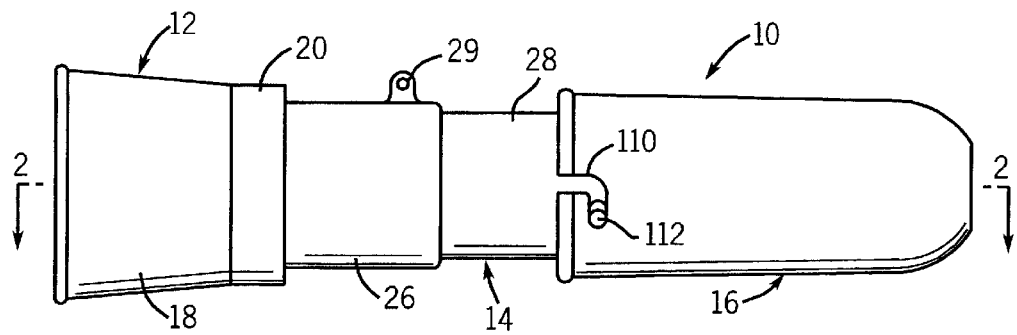
FIG. 1 is a side elevational view of a game call constructed in accordance with a preferred embodiment of the invention demonstrating the handle of the pump in the locked position.

Referring to the drawings in greater detail, attention is first directed to FIG. 1, where a game call generally designated by numeral 10 is shown. Call 10 has a resonator (or horn) 12, an elongated sound tube 14 and a handle 16.

Referring to FIGS. 1–6, resonator 12 has a conical section 18 which merges into and is integrated with an outer sleeve 20. With specific reference to FIG. 2, an inner sleeve 22 is formed within resonator 12 to define an annular recess between the outer sleeve and inner sleeve. The inner sleeve 22 terminates at a ring 24. Outer sleeve 20 extends from conical section 18 beyond inner sleeve 22 and is threaded at the interior of the sleeve to mate with the sound tube 14. Preferably, the resonator is made of plastic and is formed by a conventional molding process.

Sound tube 14 has a cam cap 26 and a body portion 28 which defines an air chamber. Preferably, the sound tube 14 is molded from the same plastic material as resonator 12. A lanyard tie hole 29 is located on the exterior of cam cap 26. The lanyard tie hole may be used to mount the game call to the hunter's gun or used to suspend the call from the hunter's neck by threading a loop through the lanyard tie hole.

Figure 6:
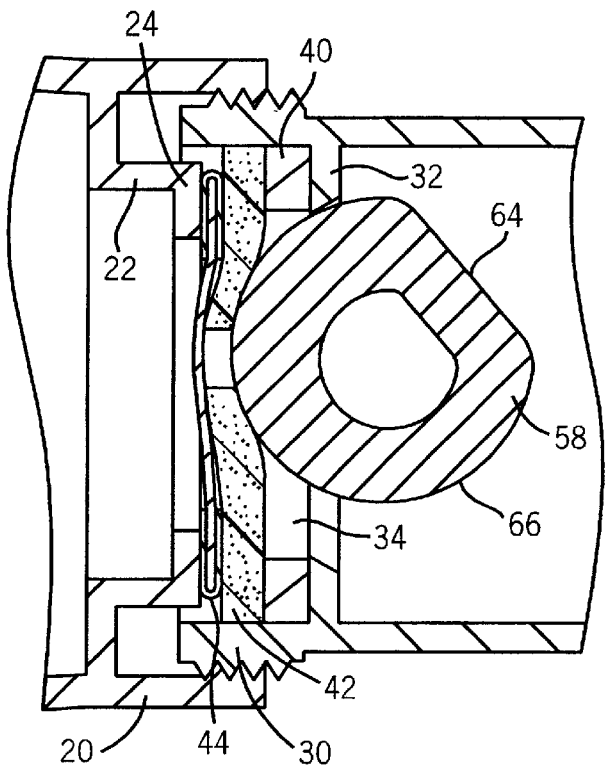
FIG. 6 is an enlarged view of the gasket contact of FIG. 4 with the cam in a second position.
Figure 7:
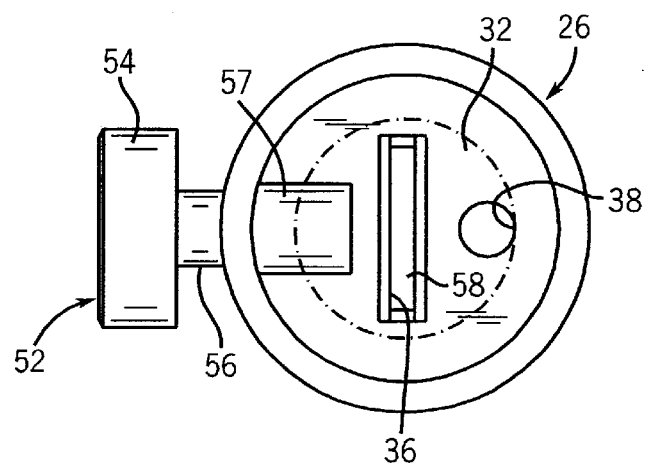
FIG. 7 is an elevational view taken along lines 7—7 of FIG. 5.

With reference to FIGS. 2 and 4–6, cam cap 26 includes a threaded sleeve 30 and a base wall 32 defining a cylindrical cavity 34 on the side of base wall 32 directed toward the resonator 12. Sleeve 30 is sized for receipt within the annular recess defined by outer sleeve 20 and inner sleeve 22 of resonator 12. With reference to FIG. 7, base wall 32 of cam cap 26 includes a rectangular slot 36 and an aperture 38 providing an air passageway from the body portion 28 to the cylindrical cavity 34.

With reference to FIGS. 3–8, prior to securing threaded sleeve 30 of cam cap 26 to outer sleeve 20 of resonator 12, a sealing member 40, a gasket 42 and a diaphragm assembly 44 are placed within cylindrical cavity 34. The sealing member 40 is placed within cylindrical cavity 34 and onto base wall 32. The sealing member has an outer diameter generally equal to the inner diameter of cylindrical cavity 34 so that the sealing member contacts the walls of the chamber when properly positioned. As indicated by a phantom line 37 in FIG. 7, the inner diameter of the sealing member 40 does not obstruct aperture 38 of base wall 32 when properly placed within the cam cap 26. In a preferred embodiment, the sealing member is made from a foam material or other resilient material capable of effectuating the connection of the components as described herein. Most preferably, the sealing member is made from a foam rubber material sold under the trademark PORON®.

Gasket 42 is generally disk shaped and has a diameter equal to the outer diameter of sealing member 40. The gasket has an aperture 46 formed therethrough at a distance from the center of the gasket. The aperture 46 is the same size as the aperture 38 of base wall 32. Apertures 46 and 38 are aligned when the gasket 42 is placed on sealing member 40 in cylindrical cavity 34. The gasket 42 is also preferable made from the same material as sealing member 40. Preferably, the foam gasket has a generally similar texture and suppleness as the human tongue.

Diaphragm assembly 44 includes a U-shaped metal frame 48 and a latex layer 50 held therein. With specific reference to FIG. 8, the diaphragm assembly 44 is placed over gasket 42 to cover at least a portion of aperture 38, and most preferably to completely cover the aperture. The diaphragm assembly is similar to the type typically placed within a user's mouth to emulate animal sounds. Any of a number of different types of diaphragms having various constructional may be used in accordance with this invention.

Once the sealing member 40, gasket 42 and diaphragm assembly 44 are in the proper position with respect to one another, the threaded sleeve 30 of cam cap 26 is received within the outer sleeve 20 of resonator 12. With specific reference to FIGS. 6 and 8, as the outer sleeve 20 of the resonator 12 is tightened, the ring 24 of resonator 12 contacts the U-shaped frame 48 of the diaphragm assembly 44 and holds the assembly against the gasket 42.

Cam cap 26 further includes a gasket contact assembly 52. With specific reference to FIG. 2, gasket contact assembly 52 includes an adjustable dial 54, a shaft 56 and a cam 58. The shaft 56 is held within a housing 57 disposed on one side of elongated sound tube 14. The housing 57 is formed completely around the length of shaft 56 within cam cap 26, and cam 58 is secured to the end of the shaft extending beyond housing 57. At the opening 59 of housing 57, an O-ring 61 is placed between the shaft 56 and tube 14. The adjustable dial 54 is secured to the shaft 56 on the outside sound tube 14. The adjustable dial may include markings such as an arrow to indicate the position of the cam 58 relative to the gasket. Likewise, corresponding indicia may be located on the sound tube around the dial.

Figure 4:
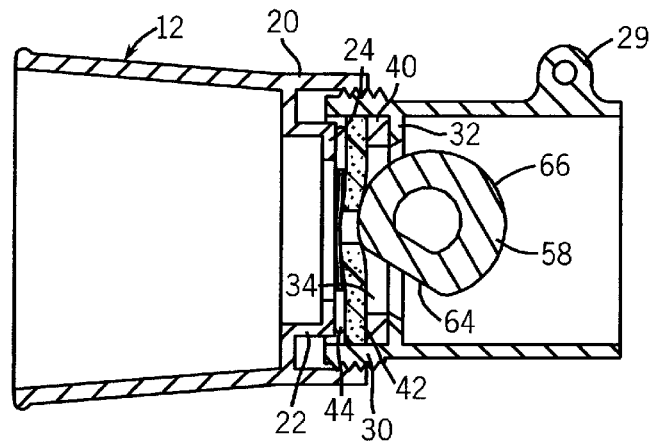
FIG. 4 is an enlarged horizontal sectional view of the gasket contact taken generally along lines 4—4 of FIG. 2.
Figure 5:
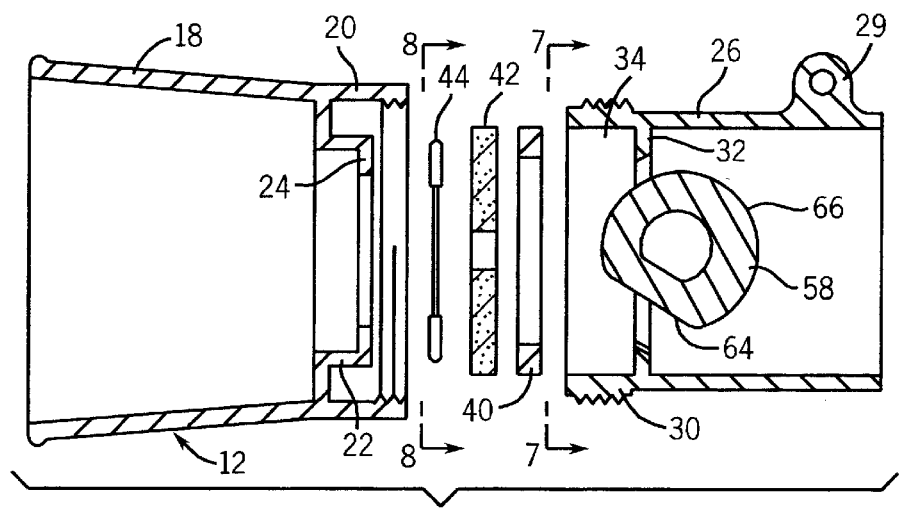
FIG. 5 is an exploded view of the gasket contact of FIG. 4 with the cam in a first position.

As shown in FIGS. 2 and 7, the cam 58 extends within slot 36 of base wall 32. With further reference to FIG. 4, cam 58 has a first, flat surface 64 and an oblong, camming surface 66. When cam 58 is rotated so that the flat portion 64 is directed in parallel relation with gasket 42, the cam does not contact the gasket. When cam 58 is rotated in either direction with respect to the position at which the flat portion 64 is parallel to the gasket 42, the camming surface 66 extends within cylindrical cavity 34 and into contact with gasket 42. As shown in FIG. 4, when the cam initially contacts gasket 42, the gasket is deflected slightly towards diaphragm assembly 44, and the pressure between the diaphragm assembly 44 and the gasket is slightly increased. As shown in FIG. 6, when the gasket is rotated further, cam 58 more significantly deflects the gasket towards diaphragm assembly 44, and the resilient forces of the latex layer 50 pull the latex layer more tightly against the gasket.

Body portion 28 is located on the end of the cam cap 26 opposite the resonator 12. Preferably, the portion is integrally formed with the cam cap and has a slightly smaller outer diameter. At the end of the body portion opposite the cam cap 26, an end cap 68 is fixed to the 20 sound tube 14. End cap 68 includes a cap 70 overlying the end of the sound tube, an outer sleeve 72 having threads for engaging the interior of body portion 28, and an inner sleeve 74. An end bore 76 is defined by inner sleeve 74 and extends through cap 70.

With reference to FIGS. 2 and 3, a spring 78 is located within the body portion of sound tube 14. The first end of the spring 78 is connected to a number of braces 80 located within the sound tube 14 near cam cap 26 and extending from base wall 32 and the shaft housing 57. The braces 80 are preferably thin, integrally formed members that provide a level base for the spring. The braces may take any alternative form that supports the spring and allows for the flow of air through the sound tube.

Figure 10:
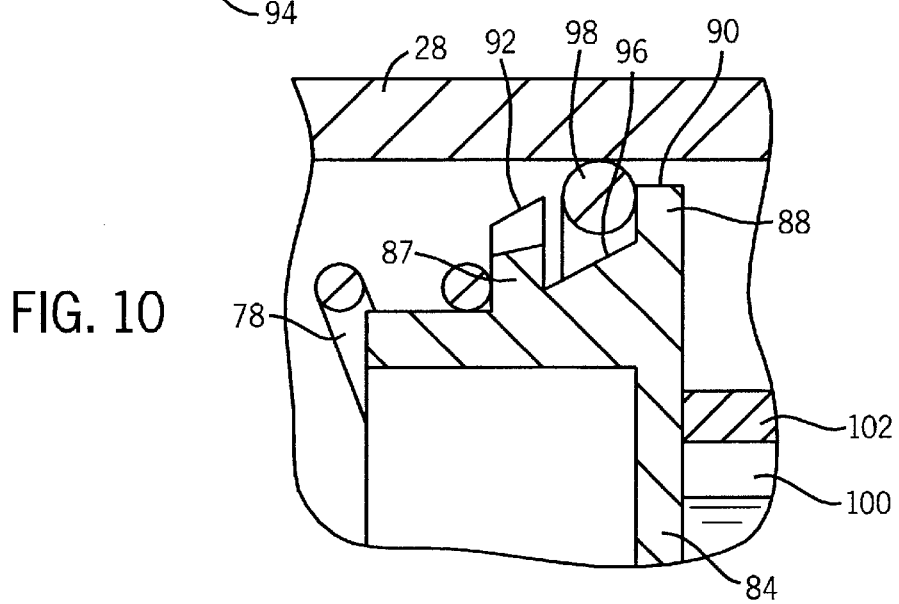
FIG. 10 is an enlarged elevational view of the game call within the area designated by the numeral 10 in FIG. 2 showing the plunger in the fully retracted position.

A plunger 82 (FIG. 3) capable of sliding within body portion 28 is secured to the opposing end of spring 78. As shown in FIGS. 2 and 10, the plunger 82 has a body 84 and a top 86 capping the body 84. The spring 78 is held about body 84 at a first annular surface 87 extending radially from the body. A second annular surface 88 extends radially from plunger 82 at top 86.

Figure 9:
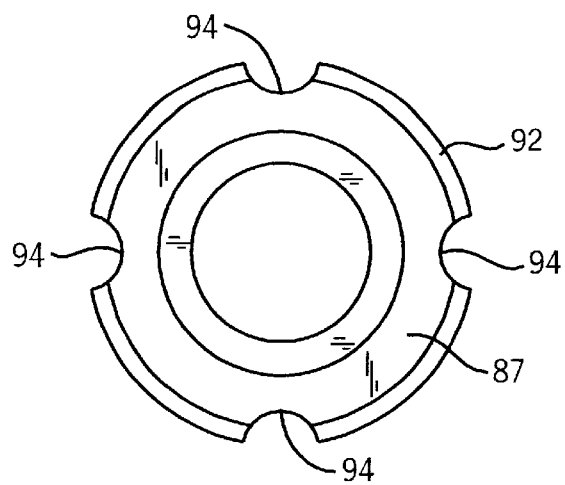
FIG. 9 is an elevational view of the plunger taken along lines 9—9 of FIG. 3.
Figure 11:
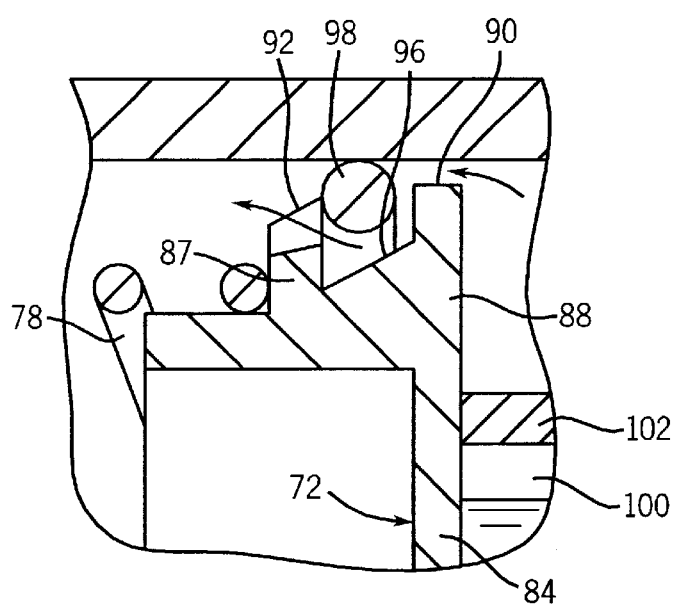
FIG. 11 is an elevational view of the plunger of FIG. 10 as the plunger is allowing intake of air.

With reference to FIGS. 10 and 11, the second annular surface 88 has a slightly smaller diameter than the inner diameter of body portion 28 and terminates in a squared edge 90 a small distance from the sound tube 14. The first annular surface 87 has a smaller outer diameter than second annular surface 88. With reference to FIGS. 9–11, first annular surface 87 has a tapered edge 92 and a plurality of notches 94 located about the periphery of the edge. The notches are preferably rounded, but may take any of a number of shapes for facilitating the flow of air around the first annular surface. The body 84 of plunger 82 has a tapered portion 96 between the squared edge of 90 of second annular surface 88 and the tapered edge 92 of first annular surface 87. An O-ring 98 is positioned within the area defined by annular surfaces 87 and 88 and tapered portion 96. As shown in FIGS. 10 and 11, the O-ring is free to move within the space bounded by the annular surfaces 87 and 88 and inner wall of the body portion 28. With reference to FIG. 3, the O-ring 98 is flexible and may be forced around first annular surface 87 prior to placement of the plunger 82 into the sound tube 14 when assembling the call.

On the side of the plunger opposite spring 78, a pump rod 100 is secured centrally to top 86 of plunger 82. The pump rod 100 (shown in two parts in FIG. 3) is preferably made of stainless steel and is secured to the plunger 82 by frictionally fitting the rod within the top 86 of the plunger. The pump rod 100 extends through end bore 76 of end cap 68, and a resilient washer 102 is placed about the shaft to dampen the impact of the plunger 82 against the end cap 68 when the game call is in operation as described below.

The handle 16 is secured to the pump rod 100 at the end opposite plunger 82. The handle 16 is comprised of a rounded end 106 and a skirt 108 extending from the rounded end. Specifically, pump rod 100 is frictionally secured within a connection sleeve 104 which projects from end the rounded end 106 of handle 16. The skirt 108 defines a hollow interior having a space of sufficient size to receive body portion 28 when handle 16 is moved toward the sound tube 14. The handle 16 also includes a lock groove 110 at the terminal end of skirt 108. The L-shaped lock groove 110 defines a channel for receipt of a handle lock pin 112 projecting radially from the exterior of the body portion 28. Preferably, the handle is also molded from a plastic material.

Figure 8:
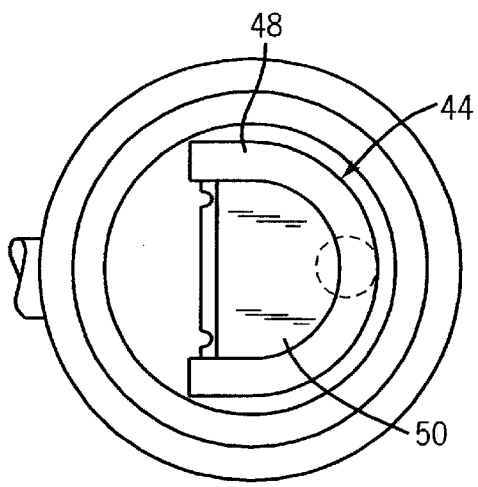
FIG. 8 is an elevational view taken along lines 8—8 of FIG. 5 demonstrating a preferred position of the diaphragm assembly relative to the air passageway.

In operation, the hunter rotates the handle 16 in a counterclockwise direction relative to the sound tube 14 so that handle lock pin 112 slides relative to lock groove 110 in the handle. When the handle lock pin 112 is cleared from the lock groove 100, the compression in spring 78 forces the handle 16 away from the cam cap 26. At this point, the user grasps adjustable dial 54 to rotate the cam 58 within slot 36. With reference to FIGS. 4 and 6, as the camming surface 66 contacts the gasket 42, the gasket is deflected towards the latex layer 50 of diaphragm assembly 44. Thus, the tension between the diaphragm assembly and the gasket is varied. The user may also tighten the resonator 12 onto cam cap 26 to vary the tension between the diaphragm assembly and gasket. Specifically, when the resonator 12 is tightened, the ring 24 of resonator 12 forces the periphery of diaphragm assembly 44 towards gasket 42 to increase the pressure between the latex layer and the gasket. The position of the diaphragm assembly with respect to the aperture 46 of gasket 42 may also be adjusted. However, as shown in FIG. 8, most desired sounds may be produced by placing the diaphragm assembly so that the aperture is near the middle of the diaphragm assembly with the aperture completely covered.

Once the adjustments are made, the user grasps handle 16 and forces it in the direction of body portion 28 which is received by skirt 108. As shown in FIG. 10, during the pumping stroke, the O-ring 98 moves into contact with the second annular surface 88 of plunger 82 and into contact with the inner walls of the body portion 28. The O-ring 98 acts as a check valve to provide a seal with the body portion so that air is forced toward cam cap 26, through aperture 38 of base wall 32 and into cylindrical cavity 34. At this point, the air is forced through aperture 46 of gasket 42, between the latex layer 50 of diaphragm assembly 44 and gasket 42 and finally out through the conical section 18 of resonator 12. As air passes over the latex layer 50 of gasket 42, the desired animal sound is produced. The sound varies depending on the tension between the latex layer 50 and the gasket 42. Typically, the sound produced by the call has a higher pitch as the tension between the diaphragm assembly and the gasket is increased.

When the push stroke is completed, the handle is forced away from the sound tube by spring 78 pushing against plunger 82. As shown in FIG. 11, during the retraction of the handle 16, O-ring 98 moves into contact with first annular surface 87 of plunger 82. Air flows around the squared end 90 of second annular surface 88, around O-ring 98 through notches 94 and back into the air chamber defined by body portion 28. Thus, the plunger 82 is retracted to the position shown in FIG. 2 without creating a vacuum and pulling air in the direction away from the cam cap 26.

The user may operate the call in a variety of different manners. For instance, instead of pushing the handle 16 toward the sound tube 14 to a position at which the plunger 82 nears the braces 80, the handle may be operated in short strokes. Moreover, the user may hold the sound tube in his or her hand and contact the handle against a solid object such as the user's leg to produce short, abrupt sounds. For instance, the clucking sound of a turkey may be emulated in this manner. Also, the user may place his or her hand around the resonator in order to vary the sounds produced by the call.

When the call is not in use, the handle 16 is depressed toward the sound tube 14 and rotated so that the handle lock pin 112 is secured within the lock groove 110. In this position, the game call is prevented from producing unwanted sounds.

The game call of the present invention is advantageous for a number of reasons. To vary the sound type, the user merely adjusts the position of the cam 58 relative to the gasket 42 or the position of the resonator 12 relative to the sound tube 14. Since the adjustable dial 54 is used to precisely vary the position of the cam, the sounds may be accurately reproduced by inexperienced users. The quick and effective adjustments allow the user to emulate a progression of animal sounds until the targeted animal is induced in proximity to the user. Moreover, the user may use the call in conjunction with a mouth operated call to produce two different sounds simultaneously to create the effect of multiple animals. Also, the game call is compact and easily carried by the user.

From the foregoing it will be seen that this invention is one well adapted to attain all ends and objects hereinabove set forth together with the other advantages which are obvious and which are inherent to the structure. It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative of applications of the principles of this invention, and not in a limiting sense.

What is claimed is:

1. A game call comprising:
   an elongated tube having an inlet and an outlet;
   a gasket disposed within said tube and defining a passageway between said inlet and said outlet, said gasket having a first surface directed toward said outlet and an opposing second surface directed toward said inlet;

a diaphragm positioned adjacent said first surface of said gasket and overlying at least a portion of said passageway, whereby an animal sound can be simulated when air passes through said passageway and between said first surface of said gasket and said diaphragm; and a gasket contact coupled with said tube proximate said first surface of said gasket and movable to deflect said gasket toward said diaphragm whereby the sound produced by the diaphragm varies depending on the position of the gasket relative to the diaphragm, said gasket contact comprising a shaft rotatably coupled with said tube and a cam located on said shaft for contacting said gasket, said cam having a contacting surface wherein said contacting surface engages said gasket to deflect said gasket toward said diaphragm.

2. The game cell of claim 1 wherein said gasket is made of a foam rubber material.

3. The game call of claim 1 wherein said gasket contact further comprises an adjustable dial coupled with said shaft and having a portion outside said elongated tube, said adjustable dial indicating the position of said cam so that a user can adjust the dial to rotate the shaft and move the cam to a desired position.

4. The game call of claim 1 further comprising a plate located between said inlet and said gasket, said plate defining an aperture in alignment with said passageway, said plate also defining a slot housing said cam.

5. The game call of claim 4 wherein a sealing member is positioned between said plate and said gasket to define a space for said cam to move relative to said gasket.

6. The game call of claim 1 further comprising a resonator coupled with said tube at said outlet, said resonator having a ring, said ring abutting said diaphragm to hold said diaphragm against said gasket.

7. The game call of claim 1 further comprising a pump assembly, said pump assembly having a plunger slidably received and moveable within said tube between said inlet and said diaphragm, whereby air is forced towards said passageway and between said gasket and said diaphragm when said plunger is translated toward said passageway.

8. A game call comprising:

an elongated tube having an inlet and an outlet;

a diaphragm disposed within said tube; and a pump assembly having a plunger slidably received within said tube between said inlet and said diaphragm, said plunger being movable with respect to said diaphragm, wherein said plunger has a first annular surface and a second annular surface and an O-ring, said O-ring being disposed between said first and second annular surfaces and moveable therebetween, said first annular surface extending in close proximity with said elongated tube wherein said O-ring is held in contact with said elongated tube by said second annular surface when said plunger is moved toward said diaphragm, whereby air passes over and vibrates said diaphragm when said plunger is moved in the direction of said diaphragm.

9. The game call of claim 8 wherein said first annular surface defines a plurality of notches wherein air flows through said notches when said plunger is moved away from said diaphragm.

10. The game call of claim 8 wherein said plunger assembly comprises a rod and a handle, the first end of the rod coupled with said plunger and the second end of the rod coupled with said handle.

11. The game call of claim 10 wherein said handle comprises a skirt, said skirt receiving a portion of said elongated tube when said plunger is moved toward said diaphragm.

12. The game call of claim 10 wherein said plunger is biased away from said diaphragm.

13. The game call of claim 12 wherein said plunger is biased by a compression spring disposed between said plunger and said diaphragm.

\* \* \* \* \*